(12) United States Patent
Hou et al.

(10) Patent No.: US 9,547,121 B2
(45) Date of Patent: Jan. 17, 2017

(54) CLADDING LIGHT STRIPPER AND METHOD OF MANUFACTURING

(71) Applicant: Lumentum Operations LLC, Milpitas, CA (US)

(72) Inventors: Kai-Chung Hou, San Jose, CA (US); Dahv Kliner, Portland, OR (US); Martin H. Muendel, Oakland, CA (US); Jeremy Weston, San Jose, CA (US)

(73) Assignee: Lumentum Operations LLC, Milpitas, CA (US)

( * ) Notice: Subject to any disclaimer, the term of this patent is extended or adjusted under 35 U.S.C. 154(b) by 321 days.

(21) Appl. No.: 14/166,600

(22) Filed: Jan. 28, 2014

(65) Prior Publication Data

US 2014/0211818 A1  Jul. 31, 2014

Related U.S. Application Data

(60) Provisional application No. 61/757,434, filed on Jan. 28, 2013.

(51) Int. Cl.
*G02B 6/02* (2006.01)
*G02B 6/28* (2006.01)
(Continued)

(52) U.S. Cl.
CPC ..... *G02B 6/02066* (2013.01); *B29D 11/00663* (2013.01); *G02B 6/14* (2013.01);
(Continued)

(58) Field of Classification Search
CPC .......... H01S 3/06733; H01S 3/094007; G02B 6/02066; G02B 6/14; G02B 6/2852; B29D 11/00663
(Continued)

(56) References Cited

U.S. PATENT DOCUMENTS 3,933,455 A * 1/1976 Chown ................ G02B 6/4203
                                                                      385/115
3,958,188 A * 5/1976 Fletcher ............. G02B 6/02066
                                                                      372/51
(Continued)

FOREIGN PATENT DOCUMENTS

CN            102255227 A  † 11/2011
WO     WO2011067908 A1  †  6/2011
WO         2012088267        6/2012 ............... G02B 6/14

OTHER PUBLICATIONS

Alexandre Wetter et al., "High power cladding light strippers," Fiber Lasers V: Technology, Systems, and Applications, ed. Jes Broeng adn Clifford Headley, Proc. of SPIE vol. 6873, 687327, (2008).†
(Continued)

*Primary Examiner* — Eric Bolda
(74) *Attorney, Agent, or Firm* — Harrity & Harrity, LLP (57) ABSTRACT

A cladding stripper includes a plurality of transversal notches or grooves in the outer surface of an exposed inner cladding of a double clad optical fiber. Position and orientation of the notches can be selected to even out cladding light release along the cladding light stripper, enabling more even temperature distributions due to released cladding light. The notches on the optical fiber can be made with a laser ablation system.

20 Claims, 11 Drawing Sheets

(51) Int. Cl.
*H01S 3/067* (2006.01)
*H01S 3/094* (2006.01)
*B29D 11/00* (2006.01)
*G02B 6/14* (2006.01)
*G02B 6/26* (2006.01)

(52) U.S. Cl.
CPC ........ *G02B 6/2852* (2013.01); *H01S 3/06733* (2013.01); *H01S 3/094007* (2013.01); *G02B 6/264* (2013.01)

(58) Field of Classification Search
USPC .................................................. 385/37, 127
See application file for complete search history.

(56) References Cited

U.S. PATENT DOCUMENTS

| | | | |
|---|---|---|---|
| 4,049,413 A * | 9/1977 | French | C03B 37/01228 359/900 |
| 4,097,118 A * | 6/1978 | Hammer | G02B 6/02066 359/900 |
| 4,400,056 A * | 8/1983 | Cielo | G02B 6/02 359/900 |
| 4,465,335 A * | 8/1984 | Eppes | G02B 6/2804 359/900 |
| 4,678,273 A | 7/1987 | Vilhelmsson | 385/128 |
| 4,710,605 A † | 12/1987 | Presby | |
| 4,842,405 A * | 6/1989 | El-Sherif | G02B 6/02066 359/566 |
| 4,911,516 A * | 3/1990 | Palfrey | G02B 6/02061 385/37 |
| 4,955,028 A * | 9/1990 | Alferness | G02B 6/02061 372/102 |
| 5,037,172 A | 8/1991 | Hekman et al. | 385/31 |
| 5,321,257 A * | 6/1994 | Danisch | G02B 6/02066 250/227.16 |
| 5,432,876 A * | 7/1995 | Appeldorn | G02B 6/001 362/554 |
| 5,500,913 A * | 3/1996 | Allen | C03B 37/15 219/121.6 |
| 5,659,643 A | 8/1997 | Appeldorn et al. | 385/31 |
| 5,790,735 A * | 8/1998 | Oleskevich | C03B 37/01234 372/6 |
| 5,854,865 A | 12/1998 | Goldberg | 385/31 |
| 6,087,655 A * | 7/2000 | Kobrin | G01D 5/34746 250/231.18 |
| 6,243,515 B1 * | 6/2001 | Heflinger | G02B 6/02066 385/32 |
| 6,624,927 B1 | 9/2003 | Wong et al. | 359/334 |
| 6,801,550 B1 * | 10/2004 | Snell | G02B 6/4214 372/6 |
| 6,865,316 B1 | 3/2005 | Pratt | 385/29 |
| 6,975,792 B1 | 12/2005 | Goldberg et al. | 385/31 |
| 7,221,840 B2 | 5/2007 | Vienne et al. | 385/126 |
| 7,324,723 B2 | 1/2008 | Shioda et al. | 385/31 |
| 7,373,070 B2 | 5/2008 | Wetter et al. | 385/134 |
| 7,526,165 B2 | 4/2009 | Nielsen et al. | 385/125 |
| 7,839,901 B2 | 11/2010 | Meleshkevich et al. | 372/6 |
| 8,027,557 B2 | 9/2011 | Frith | 385/50 |
| 8,229,260 B2 | 7/2012 | Frith | 385/43 |
| 8,355,608 B2 † | 1/2013 | Hu | |
| 2003/0174962 A1 † | 9/2003 | Poole | |
| 2005/0117860 A1 † | 6/2005 | Vienne | |
| 2007/0071389 A1 * | 3/2007 | Yoon | G02B 6/02066 385/37 |
| 2007/0258673 A1 * | 11/2007 | El-Sherif | G02B 6/02066 385/10 |
| 2010/0135339 A1 † | 6/2010 | Meleshkevich | |
| 2010/0163537 A1 † | 7/2010 | Furuta | |
| 2012/0070115 A1 | 3/2012 | Langseth et al. | 385/29 |
| 2012/0262781 A1 | 10/2012 | Price et al. | 359/341.3 |

OTHER PUBLICATIONS

K. Imen et al., "Laser-fabricated fiber-optic taps," Optic Letters, vol. 15, No. 17, Sep. 1, 1990, pp. 950-952.†

\* cited by examiner
† cited by third party

CLADDING LIGHT STRIPPER AND METHOD OF MANUFACTURING

CROSS REFERENCE TO RELATED APPLICATIONS

The present invention claims priority from U.S. Patent Application No. 61/757,434 filed Jan. 28, 2013, which is incorporated herein by reference.

TECHNICAL FIELD

The present invention relates to optical fiber devices and related methods, and in particular to devices and methods for removing cladding light in fiber amplifiers and lasers.

BACKGROUND OF THE INVENTION

Fiber lasers are an important new class of lasers that provide significant advantages of efficiency and practicality in comparison with other laser types such as free-space lasers. With the advent of a double-clad fiber (DCF), fiber lasers have been scaled to kilowatt (kW) power levels. In a DCF, pump light propagates in a relatively large inner cladding, typically 125 to 600 micrometers in diameter, and the laser light propagates in the much smaller core, typically 5 to 100 micrometers in diameter. The core is doped with ions of a rare-earth element, such as Ytterbium, and is surrounded by the inner cladding, which guides the pump light to be absorbed in the doped core for laser light amplification along the entire fiber length. Ideally, at the output of the laser, no light will be propagating in the inner cladding, and all of the output laser beam will originate from the core. In some fiber laser systems, it is similarly desirable to have exclusively core light propagating between components or between amplification stages.

In practice, the output of a fiber laser or amplifier based on a DCF consists of some core light and some cladding light. The cladding light may contain residual unabsorbed pump light and any laser light that has escaped from the core into the cladding e.g. due to scattering or spontaneous emission in the core. The cladding light may contain optical beams at a large range of divergence angles and a variety of wavelengths, depending on their source(s) and the construction of the laser system. The cladding light is deleterious for a number of applications, and should preferably be removed, or "stripped", from the fiber. For high-power fiber sources, more than 300 W of cladding light may be present, and safely and efficiently removing this light represents a significant technological challenge. Typically, the stripped cladding light is converted to heat, and care must be taken to avoid overheating fiber coatings or other components such as ferrules, splice protectors, and the like. Fiberoptic components frequently contain polymers with a limited operating temperature range, e.g. less than 85° C. maximum continuous operating temperature for some common fiber-optic polymers. To obtain a high light stripping efficiency, the stripped cladding light must be prevented from re-entering the inner cladding. Furthermore, the device used to strip the cladding light should not introduce optical losses or otherwise perturb light propagating in the fiber core.

Most prior-art cladding light strippers (CLS) use a thin layer of a high index polymer, which is applied to the cladding to "un-guide" cladding light. For example, Vilhelmsson in U.S. Pat. No. 4,678,273; Pratt in U.S. Pat. No. 6,865,316; and Frith in U.S. Pat. Nos. 8,027,557 and 8,229,260 disclose devices for stripping cladding light, which operate by coupling to the cladding a layer or layers that are index-matched to the cladding, or have a refractive index higher than the refractive index of the cladding.

Figure 1A:
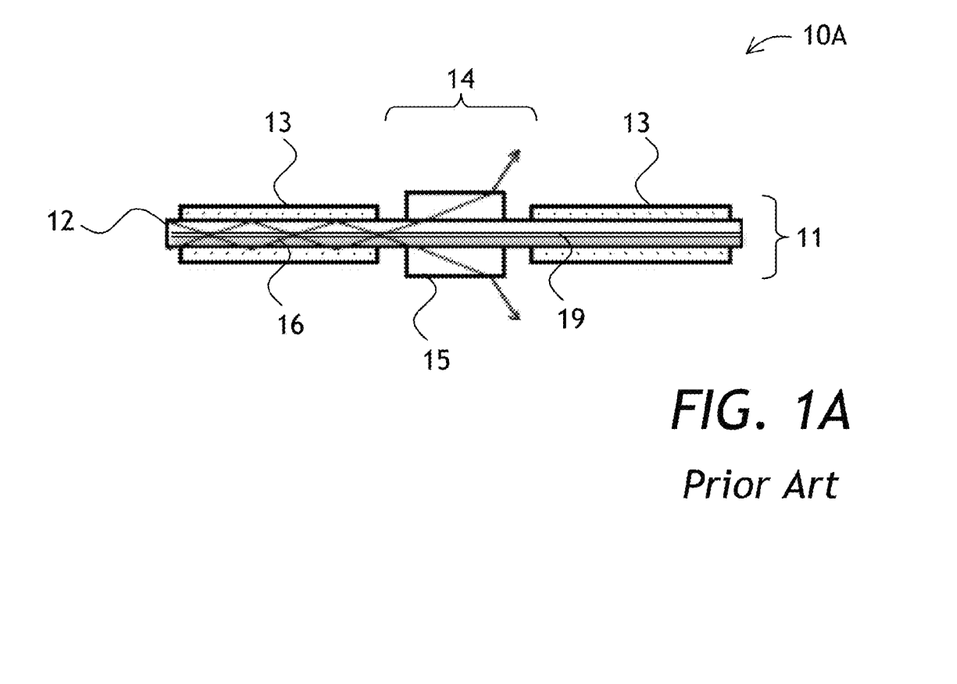
FIGS. 1A and 1B are side cross-sectional views of prior-art index-matching and roughened-surface cladding light strippers, respectively.

Referring to FIG. 1A, an index-matching cladding light stripper 10A includes an optical fiber 11 having a core 19, a cladding 12, and a coating 13, which is stripped from the cladding 12 in a middle area 14 of the optical fiber 11. A high-index polymer layer 15 is applied to the cladding 12 in the middle area 14. In operation, cladding light 16 is guided by the cladding 12. When the cladding light 16 is coupled to the high-index polymer layer 15 in the middle area 14, the cladding light 16 is coupled out of the cladding 12, as shown in FIG. 1A.

The index-matching cladding light stripper 10A can sometimes achieve good efficiency of stripping cladding light, yet its optical power scalability is limited by the highest temperature the high-index polymer layer 15 can handle, typically in the range of 100° C. to 150° C. Scaling up cladding light power using high-index or index-matched layers is challenging and limited, because using high index polymer to strip out the light has no or little ability to control stripping rate. Hence, the power handling capability of the index-matching cladding light stripper 10A is limited by localized heating.

In several prior art systems, refractive index or the thickness of polymer is selected to facilitate more even temperature distribution. For example, Meleshkevich et al. in U.S. Pat. No. 7,839,901 disclose a polymer coating having a refractive index that decreases with temperature. The polymer is index-matched to a cladding it is coated upon. When the polymer overheats due to absorption of released cladding light, its refractive index decreases, thereby limiting the local release of light from the cladding and the resultant heating, causing the cladding light to be released at some location downstream of the overheated point. As a result, the heat release becomes more uniform.

Optical and thermal properties of polymer-based cladding strippers, such as absorption of IR radiation, spectral dependence, heating rate, and thermal damage threshold, contribute to limiting the maximum cladding light power that can be stripped to approximately 100 W. In a practical fiber laser system, cladding light usually includes high numerical aperture (NA) residual pump light and low NA scattered core light. The low NA light is difficult to remove with polymer based cladding light strippers, since the strip rate of these strippers is very sensitive to NA of the light. High NA light tends to strip out in a much shorter distance compared to low NA light. Heat load of polymer based cladding light strippers is highly non-uniform, and extra length must be used to achieve desired strip rate for the low NA cladding light.

Figure 1B:
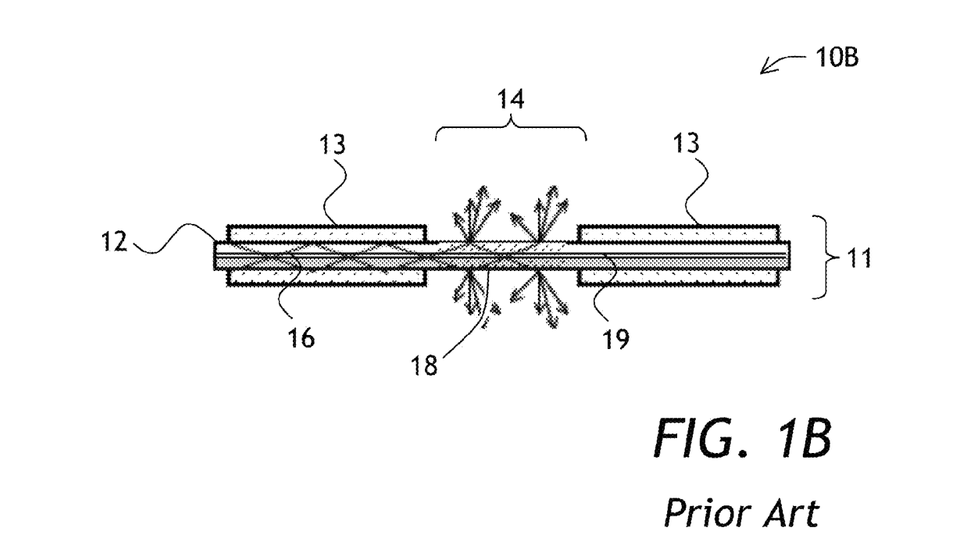

Langseth et al. in U.S. Patent Application Publication 2012/0070115 and Majid et al. in a PCT application WO 2012088267 disclose optical fibers having a roughened outer surface of the cladding, to scatter the light out of the cladding. By way of example, referring to FIG. 1B, a roughened-surface cladding light stripper 10B includes the optical fiber 11 having the core 19, the cladding 12, and the coating 13, which is stripped off the cladding 12 in the middle area 14 of the optical fiber 11. An outer surface 18 of the cladding 12 is roughened in the exposed middle area 14. In operation, the cladding light 16 is guided by the cladding 12. When the cladding light 16 is coupled to the roughened outer surface 18, the cladding light 16 is scattered out of the cladding 12 as shown in FIG. 1B.

One advantage of this approach is that the cladding stripper can be polymer free. Detrimentally, most of the cladding light is stripped in the upstream portion of the cladding stripper, creating uneven temperature distribution in the stripper. Furthermore, roughening the surface may generate micro-cracks that can propagate over time and cause the fiber to fail.

SUMMARY OF THE INVENTION

It is a goal of the invention to provide a manufacturable, customizable cladding light stripper suitable for high power fiber lasers.

A cladding stripper of the invention includes a plurality of transversal notches or grooves in an outer surface of an inner cladding of a double clad optical fiber. Advantageously, position and orientation of the notches can be selected to even out cladding light release along the cladding light stripper, enabling a more even temperature distribution due to released cladding light. Furthermore, a cladding stripper can be made polymer-free, thus allowing scaling to high optical power levels.

In accordance with the invention, there is provided a cladding light stripper comprising:

a double-clad optical fiber having a core for guiding signal light, an inner cladding surrounding the core, and an outer cladding surrounding the inner cladding, wherein the optical fiber includes a stripped portion wherein the outer cladding is removed, forming an exposed section of an outer surface of the inner cladding, wherein the exposed section includes a plurality of transversal notches disposed along the fiber, to enable light to escape the inner cladding upon impinging on the notches, wherein each of the plurality of notches has a depth of only a partial distance to the fiber core.

The cladding light stripper can include an opaque screen or heat sink disposed adjacent the stripped portion of the outer cladding, for absorbing light escaped the inner cladding, and for dissipating heat produced by the absorbed light.

In accordance with the invention, there is further provided an optical fiber amplifier comprising the cladding light stripper, an amplifier double-clad optical fiber portion coupled to the double-clad optical fiber of the cladding light stripper at a first end of the amplifier double clad optical fiber portion, and a pump diode optically coupled to the inner cladding at a second opposing end of the amplifier double clad optical fiber portion, for providing the pump light for propagation from the second end to the first end of the amplifier double clad optical fiber portion.

In accordance with another aspect of the invention, there is further provided a fiber laser comprising the optical fiber amplifier including the cladding light stripper, and an oscillator optically coupled to the optical fiber amplifier.

In accordance with yet another aspect of the invention, there is further provided a method of forming the cladding light stripper of claim 1, the method comprising:

a) removing a portion of the outer cladding leaving the exposed section of the inner cladding;

b) focusing a laser beam on the outer surface of the inner cladding in the exposed section to evaporate and remove the inner cladding locally to form a transversal notch in the inner cladding; and c) repeating step b) a plurality of times at different locations along the exposed section.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 2A:
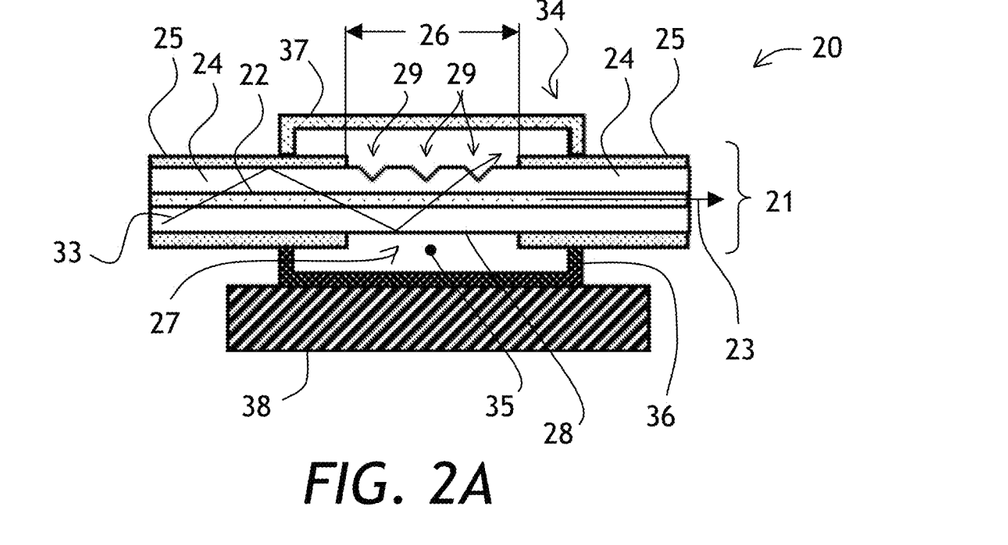
FIG. 2A is a side cross-sectional view of a cladding light stripper according to one embodiment of the invention.
Figure 2B:
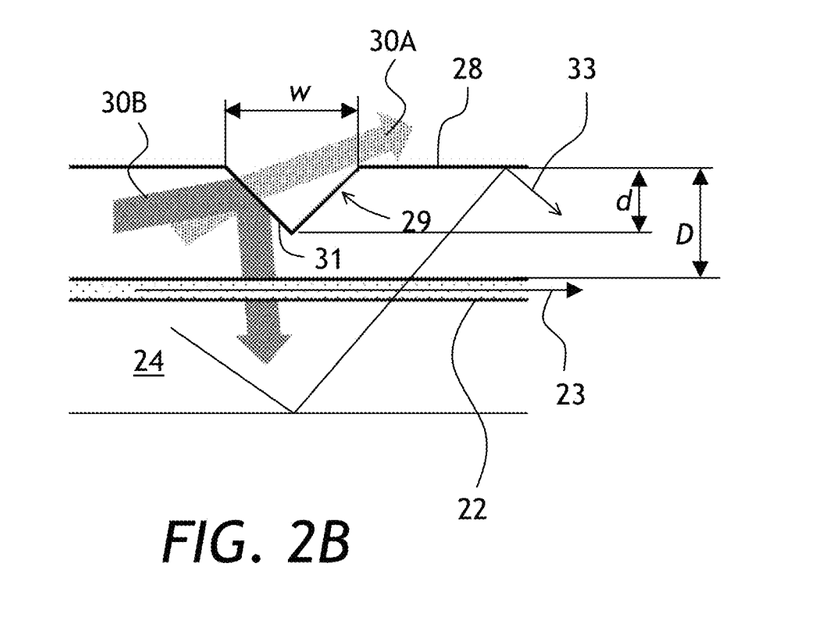
FIG. 2B is a magnified view of FIG. 1A showing cladding light reflecting and refracting at a surface of a notch.

Referring to FIGS. 2A and 2B, a cladding light stripper 20 includes a double-clad optical fiber 21 having a core 22 for guiding signal light 23, an inner cladding 24 surrounding the core 22, and an outer cladding 25 surrounding the inner cladding 24. The optical fiber 21 includes a stripped portion 26 wherein the outer cladding 25 is removed, forming an exposed section 27 of an outer surface 28 of the inner cladding 24. Thus, the stripped portion 26 is absent the outer cladding 25. The exposed section 27 includes a plurality of transversal notches 29 disposed along the fiber 21 in the exposed section 27 of the outer surface 28 of the inner cladding 24 to enable cladding light portions 30A, 30B (FIG. 2B) to escape the inner cladding 24 upon impinging on the notches 29 by refracting through a side surface 31 of the notches 29 (light portion 30A) or reflecting from the side surface 31 (light portion 30B). Herein, the term "transversal" is not limited to the notches 29 being perpendicular to the optical fiber 21, i.e. the notches 29 can be angled with respect to the optical fiber 21, while still being "transversal". Each of the plurality of notches 29 has a width w and a depth d of only a part of a distance D (FIG. 2B) to the fiber core 22. In other words, each notch 29 is clear of the fiber core 22, not touching or expanding into the fiber core 22. At least 10 notches 29, and more preferably at least 30 notches 29 can be provided. The depths of the notches 29 can be e.g. between 5% and 20% of the diameter of the inner cladding, or 20 micrometers to 80 micrometers deep.

In the embodiment shown in FIG. 2A, the cladding light stripper 20 includes an optional heat sink 34 disposed adjacent the stripped portion 26 of the outer cladding 25, for absorbing the light portions 30A, 30B that escaped the inner cladding 24, and for dissipating heat produced by the absorbed light portions 30A, 30B. To that end, the heat sink 34 forms a cavity 35 around the stripped portion 26 for intercepting the light portions 30A, 30B, which escaped the inner cladding 24. Preferably, the cavity 35 has an absorbing portion 36 and a reflecting portion 37 for directing the escaped light portions 30A, 30B to the absorbing portion 36. The absorbing portion 36 can be thermally connected to an external heat sink 38. The heat sink 34 can also be made out of other material with high heat conductivity of at least 10 W/m-K, more preferably greater than at least 100 W/m-K such as aluminum or copper, for example.

Figure 3:
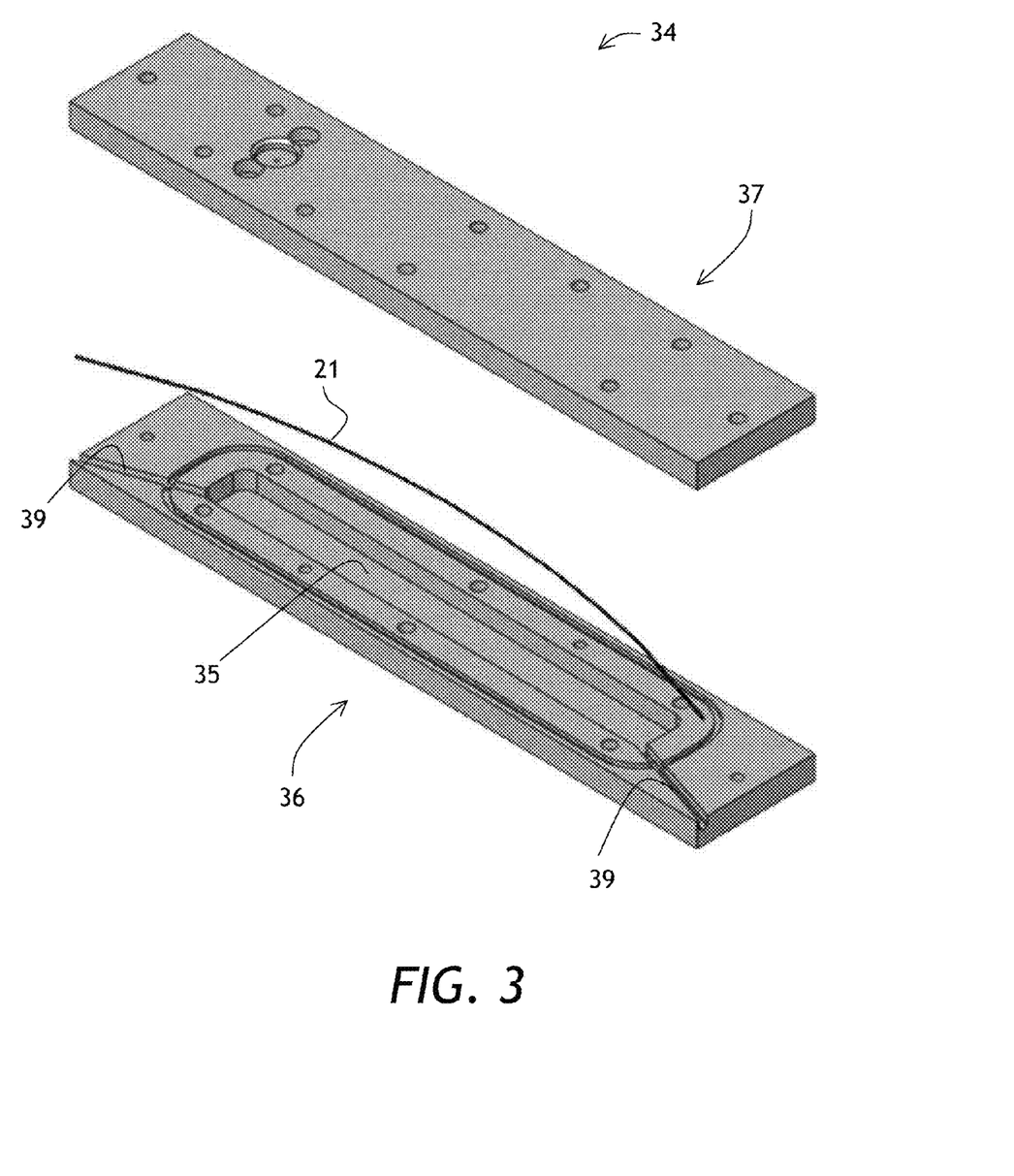
FIG. 3 is an exploded three-dimensional view of a neat sink of the cladding light stripper of FIG. 2A.

A prototype of the heat sink 34 is shown in FIG. 3. The absorbing 36 and reflecting 37 portions of the heat sink 34 of FIG. 3 are made out of aluminum blocks. The cavity 35 is machined in the absorbing portion 36. Grooves 39 are machined in the absorbing portion 36 for guiding and holding the optical fiber 21. The grooves 39 ensure that the optical fiber 21 is slightly bent in the heat sink 34, preferably to a bending radius of between 50 cm and 200 cm. The bending is done for two reasons: first, to relieve thermally induced stresses in the fiber 21 and second, to improve stripping rate, as will be explained below. The absorbing portion 36 is black-anodized, while the reflecting portion 37 is polished or white-anodized. The dimensions of the heat sink 34 of FIG. 3 are 220 mm×32 mm×11 mm. Preferably, at least 40 mm, and more preferably at least 160 mm of the outer cladding 25 of the fiber 21 can be stripped to form the stripped portion 26. When 160 mm of the outer cladding 25 is removed, at least 140 mm of the outer surface 28 of the inner cladding 24 can be made available for forming the notches 29. The number of the notches 29 per unit length, herein termed "pitch", can vary from 1 notch/cm to 1000 notches/cm, and more preferably from 10 notches/cm to 500 notches/cm.

The optical fiber 21 can be either an active fiber providing gain in fiber lasers and fiber optical amplifiers or a passive fiber, e.g. an output fiber spliced onto an active fiber or a power-delivery fiber that can be used with any laser. In the active optical fiber 21, the core 22 includes a dopant, e.g. rare earth ions such as Ytterbium and/or Erbium ions, for amplifying the signal light 23 when pumped by pump light 33 (FIGS. 2A and 2B) guided by the inner cladding 24. In operation, the optical fiber 21 is pumped by coupling a pump light source, not shown in FIGS. 2A and 2B, into the inner cladding 24. The pump light 33 is mostly absorbed by the rare earth ions in the core 22. The rare earth ions amplify the signal light 23 propagating in the core 22. Usually, a portion of the pump light 33, herein termed "residual pump light", remains unabsorbed. The light portions 30A and 30B originate mostly from the residual pump light 33; however, they can also originate from the signal light 23 scattered or spontaneously emitted from the core 22. Typically, the residual pump light 33 is a high NA light and the scattered signal light 23 is a low NA light. The amount of light escaping from the cladding 24 depends on the divergence of the cladding light 33 and the depth of the notches 29. For low NA light, part of the escaped light can re-enter the inner cladding 24. Cladding light strip rate can be adjusted by adjusting size of the notches 29, angle of incident and the geometry of the notches 29, the pitch of the notches 29, and some other parameters, as discussed below.

The notches 29 can be made on multiple sides of the optical fiber 21. Referring to FIGS. 4A to 4D with further reference to FIG. 2A, the notches 29 can be made on one side (FIG. 4A), on two sides (FIG. 4B), three sides (FIG. 4C), four sides (FIG. 4D), and so on, spaced around a circumference of the exposed section 27. The notches 29 can be spaced both along the length of the exposed section 27 and around the circumference of the exposed section 27. Furthermore, the notches 29 can be disposed in a helical pattern around the core 22 of the double-clad optical fiber 21.

For high power fiber laser applications, it is highly desirable to have comprehensive control of the cladding light strip rate along the cladding light stripper 20. The "strip rate" is defined as optical power loss of the cladding light 33 per unit length of the inner cladding 24, for example optical power loss in dB per unit length in mm. The desired strip rate is selected based on thermal management requirements, length limitation of the cladding mode stripper 20, and other material properties limitations.

The strip rate can be varied by number of sides of the optical fiber 21 where the notches 29 are made. The strip rate is typically higher as the number of sides increases, since it provides more escaping points for the cladding 24 to scatter light out. The strip rate also increases with the density and the depth d of the notches 29.

Figure 4A:
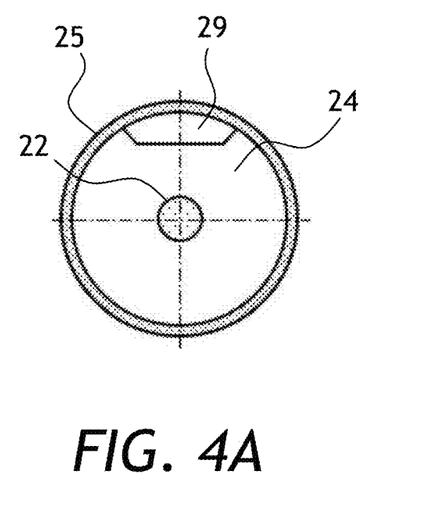
FIGS. 4A, 4B, 4C, and 4D are cross-sectional views of a double-clad optical fiber having notches on one, two, three, and four sides, respectively.
Figure 4B:
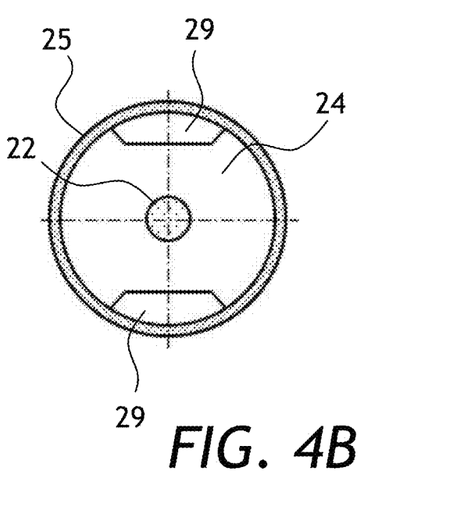
Figure 4C:
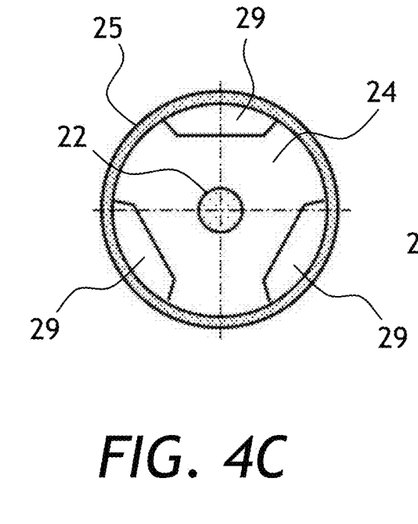
Figure 4D:
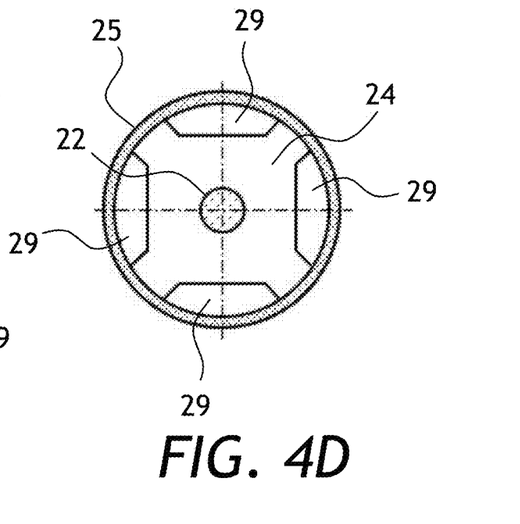
Figure 5:
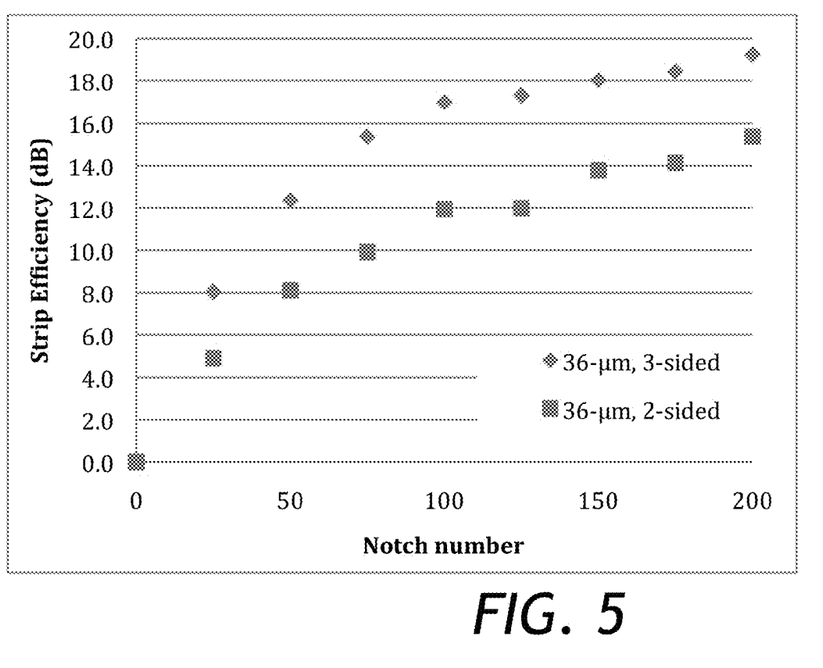
FIG. 5 is an experimental plot of strip efficiency vs. number of notches for two-sided and three-sided notches.

The total number of notches 29 impacts strip efficiency. The "strip efficiency" is defined herein as a total optical power loss after propagating through the cladding light stripper 20. The strip efficiency has been measured using prototypes of the cladding mode stripper 20 with different number of notches 29 and number of sides the notches 29 are disposed on. Referring to FIG. 5, the 36 micrometer deep notches 29 (d=36 micrometers) have been made on a double-clad fused silica fiber measuring 400 micrometers in diameter when the outer (polymer) cladding was stripped away. The strip efficiency generally increases as the total number of the notches 29 increases. The strip efficiency shown in FIG. 5 is higher by about 3-4 dB for three-sided notches (FIG. 4C) as compared with two-sided notches (FIG. 4B).

Figure 6:
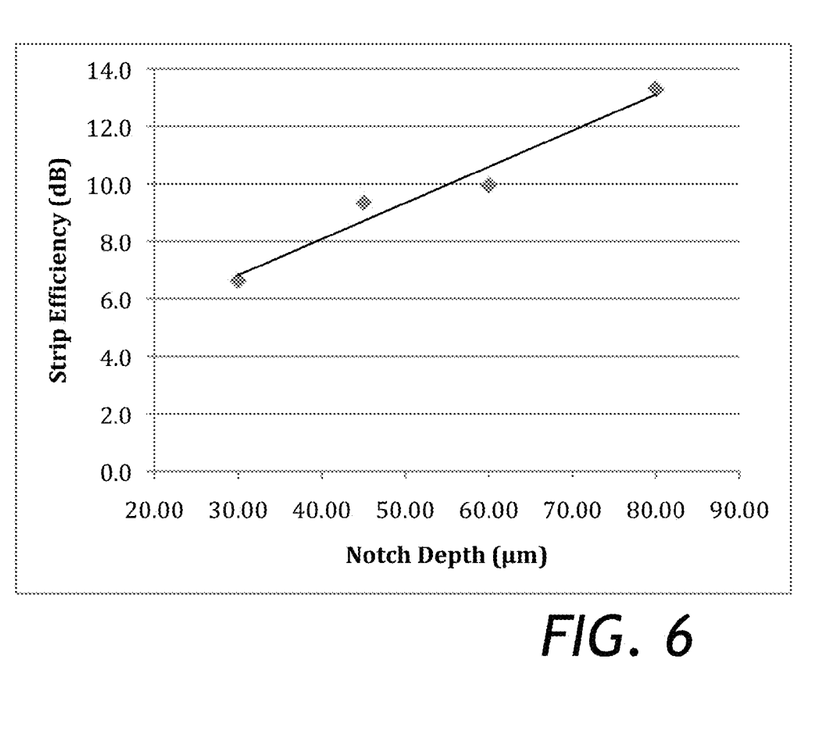
FIG. 6 is an experimental plot of strip efficiency vs. notch depth.

The strip rate and efficiency also depend on the geometry, for example, the width w, the depth d (FIG. 2B) of the notches 29, hence providing another engineering degree of freedom to control the strip efficiency. The depth d of the notches 29 is usually kept in between 5% and 20% of the fiber 21 diameter, to maintain the tensile strength of the fiber 21, and to lessen micro-bending on the core 22 due to the notches 29. Referring to FIG. 6, the strip efficiency has been measured as a function of the depth d of the notches 29, while other parameters such as the number of sides 31, the number of notches 29, and a distance between the notches 29 were kept the same. It is seen that the strip efficiency changes by over 7 dB as the depth d increases from 30 micrometers to 80 micrometers.

Figure 7:
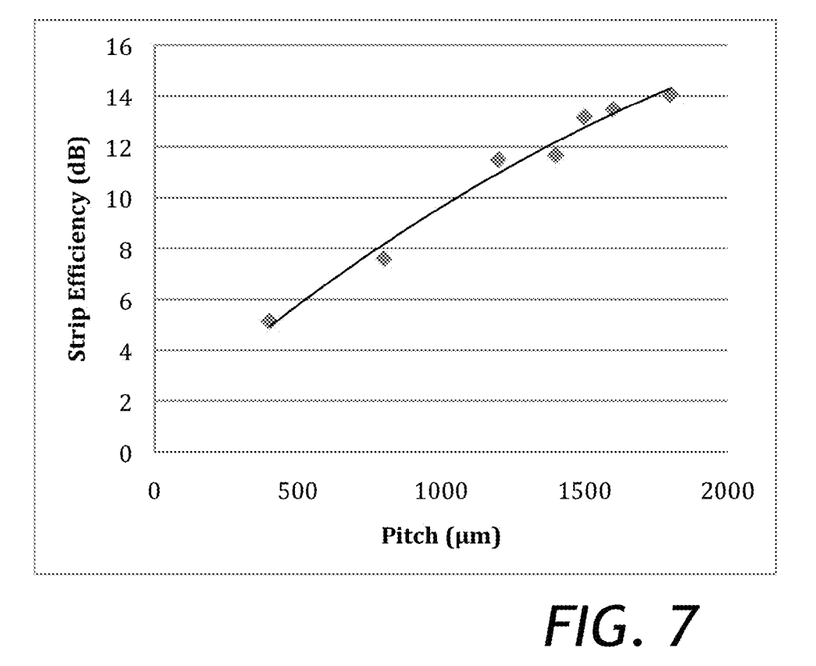
FIG. 7 is an experimental plot of strip efficiency vs. notch pitch.

Another way to optimize the strip rate and/or strip efficiency is by changing the distance between neighboring notches 29, herein termed "pitch", to allow propagation of un-escaped light to reach the next sets of notches 29. Turning to FIG. 7, the strip efficiency is shown as a function of the pitch parameter. The strip efficiency varies by approximately 9 dB as the pitch varies from 400 to 1800 micrometers.

Figure 8:
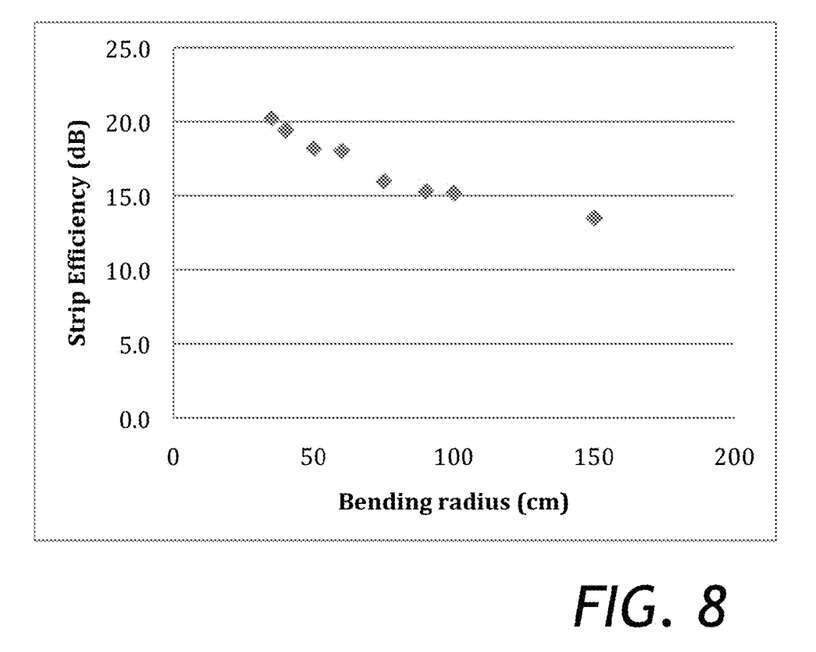
FIG. 8 is an experimental plot of strip efficiency vs. fiber bending radius.
Figure 9:
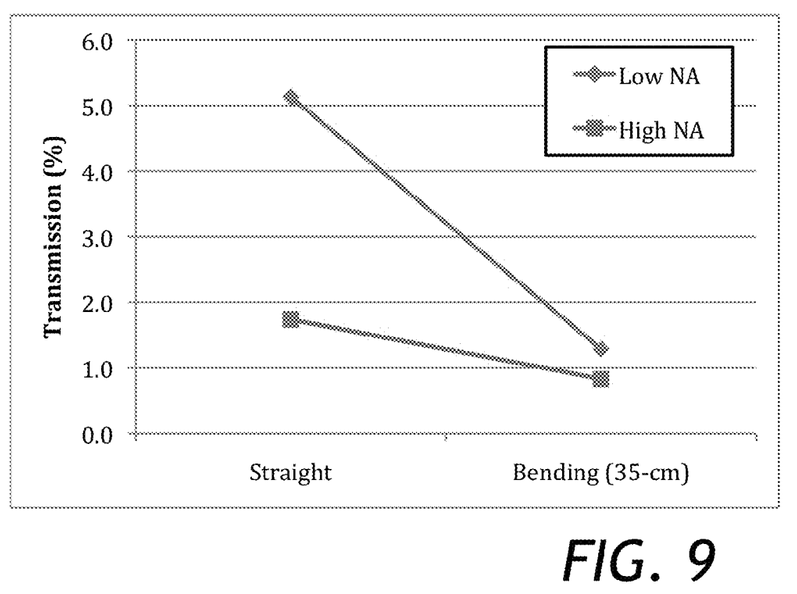
FIG. 9 is an experimental plot of optical transmission of low NA and high NA light as a function of bending radius.

The strip rate and efficiency are also sensitive to bending of the exposed section 27 of the cladding mode stripper 20. As the bending of the exposed section 27 increases, incident angle relative to the surface of the notches 29 increases, therefore reducing the amount of light that will couple back to the inner cladding 24. As a result, the amount of light escaping from individual notches 29 increases, especially for low NA light, as shown in FIG. 8. The capability of the light cladding stripper 20 to remove low NA light is very important, since it can narrow down the strip rate difference for the low and high NA light, making it easier to control the heat distribution in the heat sink 34. One example of influence of the bending is shown in FIG. 9, showing that the difference in the strip efficiency for low and high NA light is greatly reduced when the optical fiber 21 is moderately bent to a radius of 35 cm.

The dependence of the strip rate and the strip efficiency on the number and depth d of notches 29, notch pitch, and the bending radius of the optical fiber 21 allows one to accommodate various cladding light stripping requirements in specific laser systems, such as power handling capability, cooling requirements, material constraints, requirement on device foot-print, and other constraints and requirements. Accordingly, one benefit of the cladding light stripper 20 is a highly flexible control of heat distribution. It is generally preferable to have very low strip rate at the beginning, or upstream, of the stripped portion 26, to limit optical power density of the light portions 30A, 30B escaping from the inner cladding 24. At the downstream of the stripped portion 26, it is desirable to increase the strip rate, in order to clean up the residual cladding mode light.

The amount of heat dissipated at a given point of the inner cladding 24 can be calculated by remaining cladding light power and the strip rate. In the case where the strip rate is constant along the length of an optical fiber, as in most conventional cladding light strippers using high index polymers, the heat load will be much higher at the beginning of the device, and decrease exponentially along the device. As the desired strip power goes up, this characteristic will cause very high temperatures at the beginning of the device, thereby limiting the amount of total power that the device can dissipate.

To optimize the heat dissipation in the cladding mode stripper 20, one needs to know the desired dissipating power per unit length, which is dictated by the amount of total cladding light power, desired device footprint or the length of the cladding mode stripper 20, or maximum heat density that the heat sink 34 can handle. One can then calculate the desired local strip rate along the cladding mode stripper 20. Based on the strip rate per notch 29 as function of notch 29 size, pitch, and number of sides, one can adjust the notch pitch or size to achieve the desired strip rate.

Figure 10:
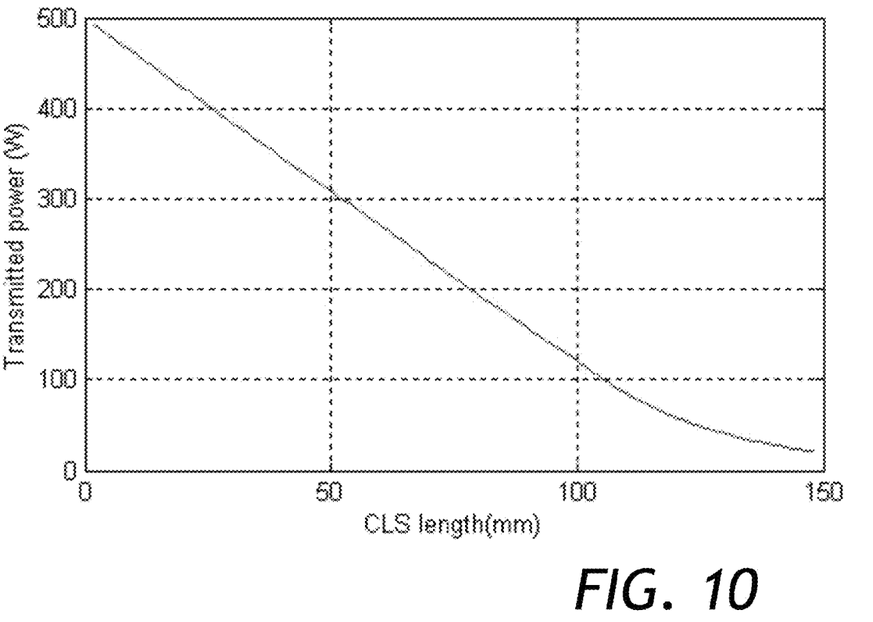
FIG. 10 is a calculated plot of transmitter power vs. cladding light stripper length for uniformly distributed notches.
Figure 11:
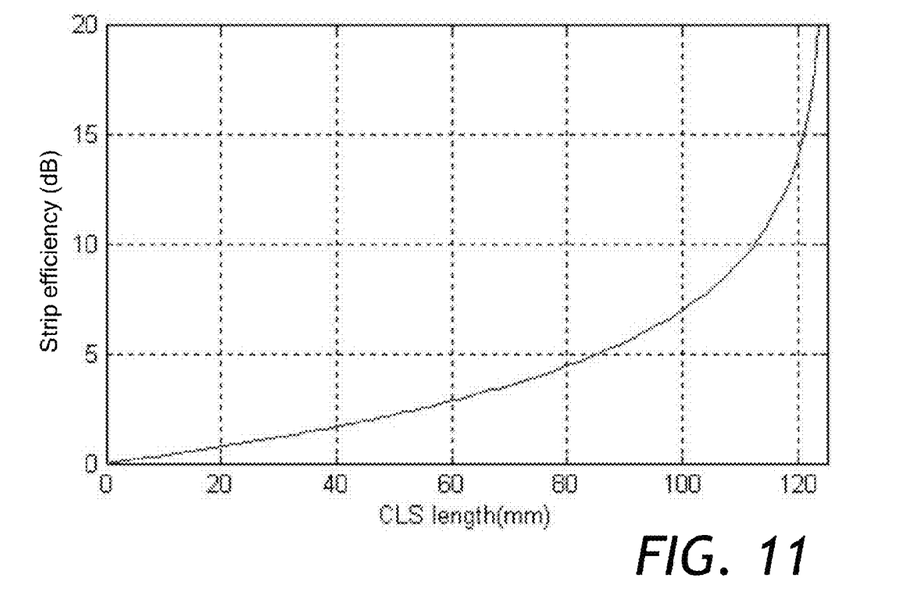
FIG. 11 is a calculated plot of strip efficiency vs. cladding light stripper length.
Figure 12:
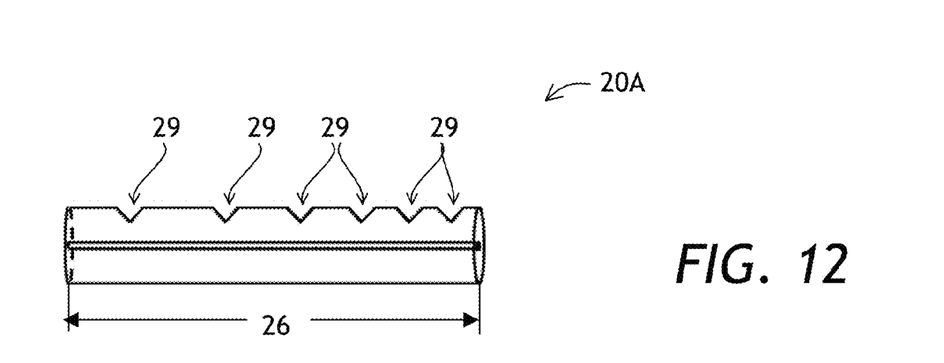
FIGS. 12 and 13 are a side cross-sectional views of a cladding light stripper of the invention having varying notch pitch and notch depth, respectively.

Referring now to FIGS. 10, 11, 12, and 13 with further reference to FIG. 2A, an example of cladding light power dissipated at a constant strip rate is shown in FIG. 10. The transmitted optical power decreases almost linearly with the length along the cladding light stripper 20 (FIG. 2A). To even out the heat distribution along the cladding mode stripper 20, the strip rate must be made lower at the beginning of the stripped portion 26, as illustrated in FIG. 11. To decrease the strip rate in the beginning of the stripped portion 26, either the notch density needs to be decreased in the beginning of the stripped portion 26, as shown in a cladding mode stripper 20A of FIG. 12, or the notch depth d needs to be decreased in the beginning of the stripped portion 26, as shown in a cladding mode stripper 20B of FIG. 13; or both the notch density and the notch depth d need to be decreased in the beginning of the stripped portion 26. Preferably, the notch pitch of the cladding light stripper 20A of FIG. 12 is gradually increasing from 2 notches/cm to 200 notches/cm, and more preferably from 5 notches/cm to 20 notches/cm, in going from left to right in FIGS. 12 and 13.

Figure 13:
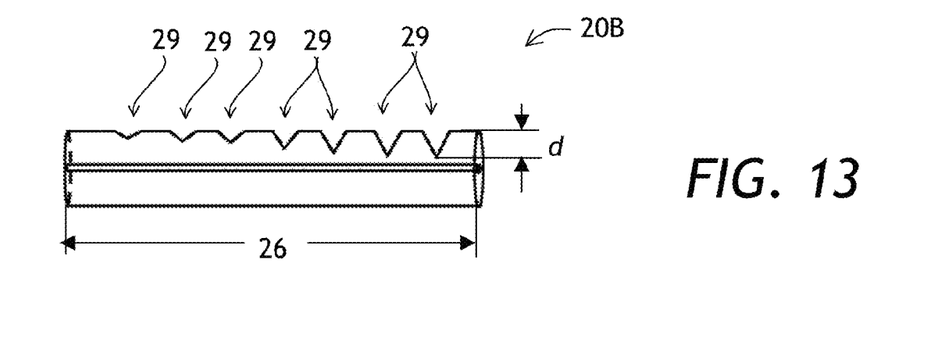
Figure 14A:
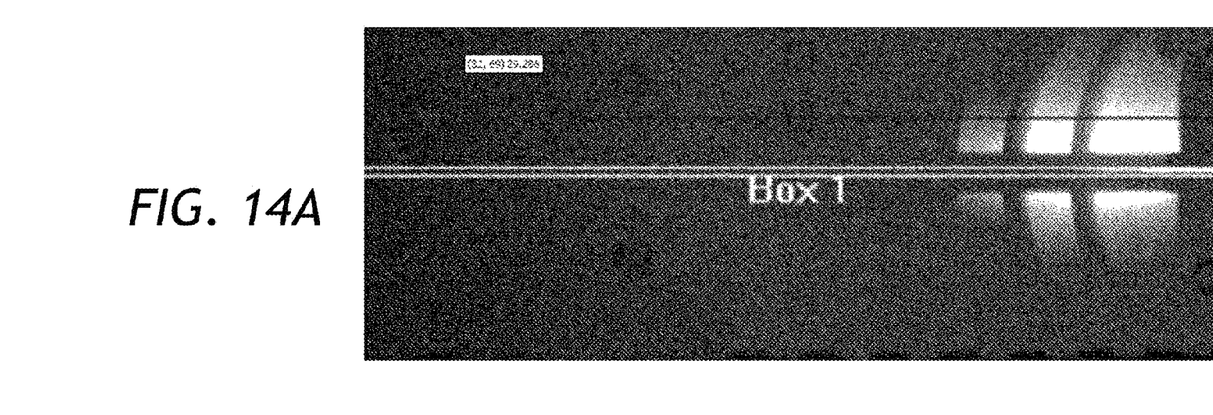
FIG. 14A is a measured surface temperature distribution of a cladding mode stripper prototype having a constant notch pitch and depth.
Figure 14B:
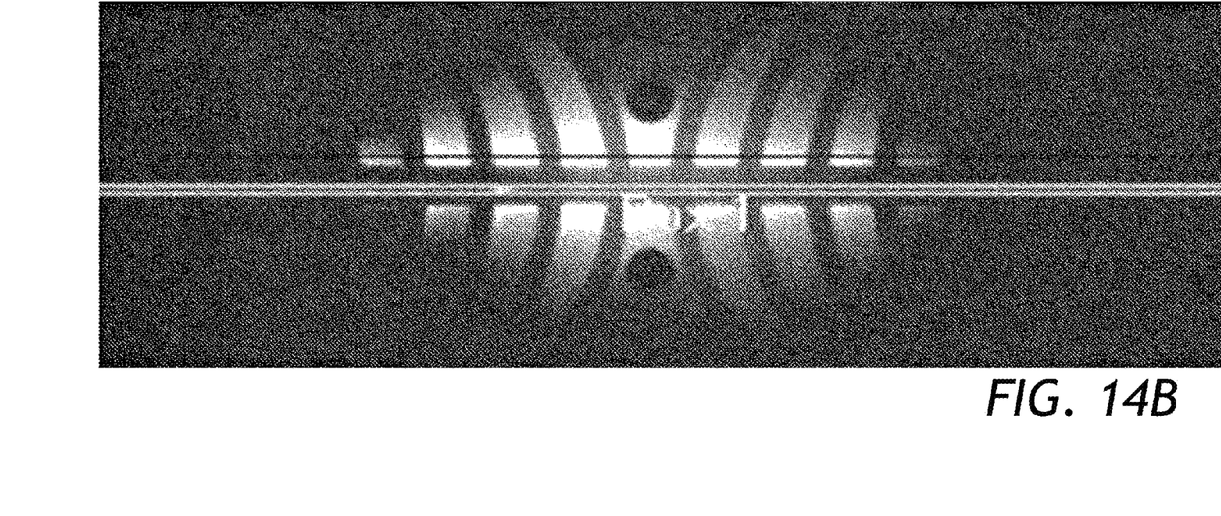
FIG. 14B is a measured surface temperature distribution of a cladding mode stripper prototype having a varying notch pitch and depth.

Two prototype cladding mode strippers were built to demonstrate the capability of the cladding mode strippers 20 of FIG. 2A, 20A of FIG. 12, and 20B of FIG. 13 to even out the heat distribution due to the stripped cladding light 30A, 30B. Referring to FIG. 14A, a heat distribution in the heat sink 34 at a constant notch 29 depth d and spacing (pitch) is shown. One can see that most of the heat is dissipated at the beginning at left-hand side of the heat sink 34. This type of heat distribution is also common in prior-art cladding mode strippers, where the strip rate is constant along the device. Turning now to FIG. 14B, a heat distribution in the heat sink 34 at a varying notch 29 depth d and spacing (pitch) is shown. The temperature profile of the heat sink 34 is more even, indicating a more distributed heat load along the heat sink 34. The benefit of the varying notch 29 size and spacing can be quantified by temperature increase of the heat sink 34. For the prototype device of FIG. 14B, the temperature increase on the heat sink is only 34 degrees C. for total stripped power of approximately 450 W, which is only half of the temperature increase for the non-distributed heat load cladding mode stripping (FIG. 14A) at the same stripped power level of approximately 450 W.

Figure 15:
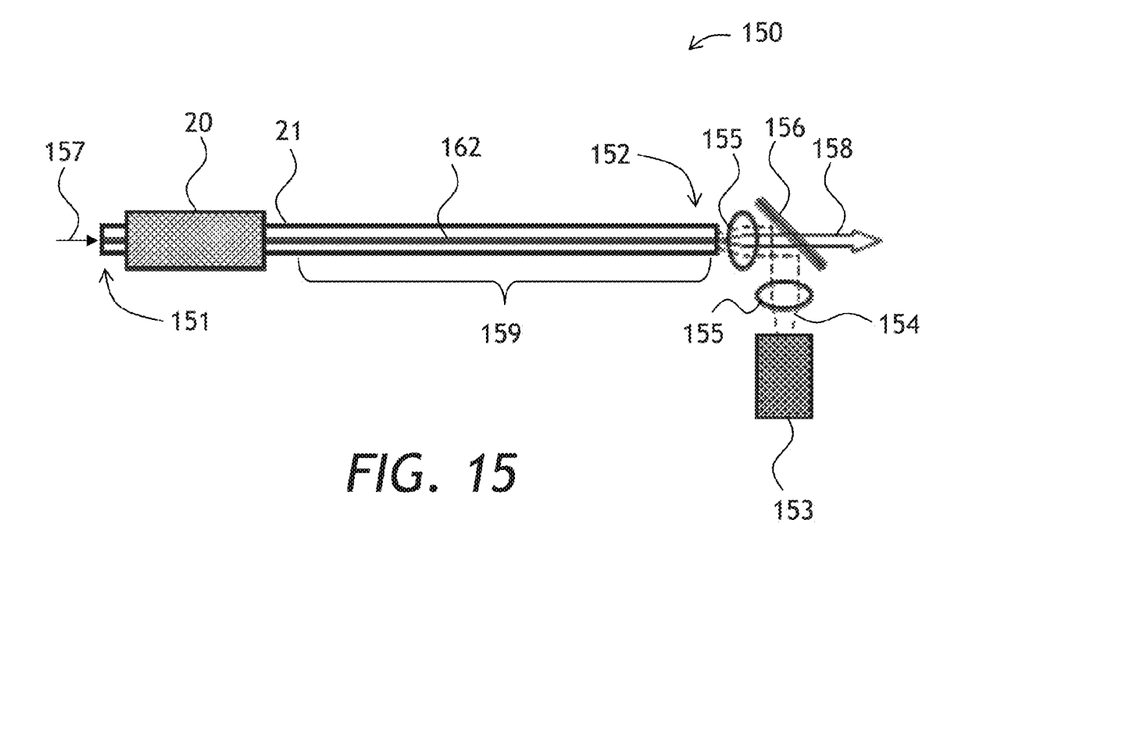
FIG. 15 is a schematic view of an optical fiber amplifier including a cladding light stripper of the invention.

Applications of the cladding mode stripper 20 of FIG. 2A will now be considered. Referring to FIG. 15, an optical fiber amplifier 150 includes the cladding light stripper 20 and an amplifier double clad optical fiber portion 159, which is coupled to the double clad optical fiber 21 of the cladding light stripper 20 at a first end 151 of the amplifier double clad optical fiber portion 159. A pump diode 153 is optically coupled e.g. via lenses 155 and a dichroic mirror 156, to a second opposing end 152 of the amplifier double clad optical fiber portion 159. In operation, the pump diode 153 generates pump light 154 shown in dashed lines, which is coupled to the amplifier double clad optical fiber portion 159 for propagation from the second end 152 to the first end 151 of the amplifier double clad optical fiber portion 159. The dichroic mirror 156 reflects light at the pump wavelength, but transmits light at the signal wavelength. When the pump light 154 is absorbed in a doped core 162 of the amplifier double clad optical fiber portion 159, an input optical signal 157 is amplified, and an output optical signal 158 shown in solid lines, or laser light 158, exits the amplifier via the dichroic mirror 156. The cladding light stripper 20 removes most of the residual pump light 154 that has not been absorbed in the doped core 162 of the amplifier double clad optical fiber portion 159.

The cladding mode stripper 20 can include e.g. an undoped double clad fiber section spliced to the amplifier double clad optical fiber portion 159, or it can include another portion of a same active (doped) double clad optical fiber that includes the amplifier double clad optical fiber portion 159. In one embodiment of the invention, the cladding light stripper 20 can have a light stripping efficiency of at least 15 dB at residual optical power levels of the pump diode 153 of at least 200 W.

Figure 16:
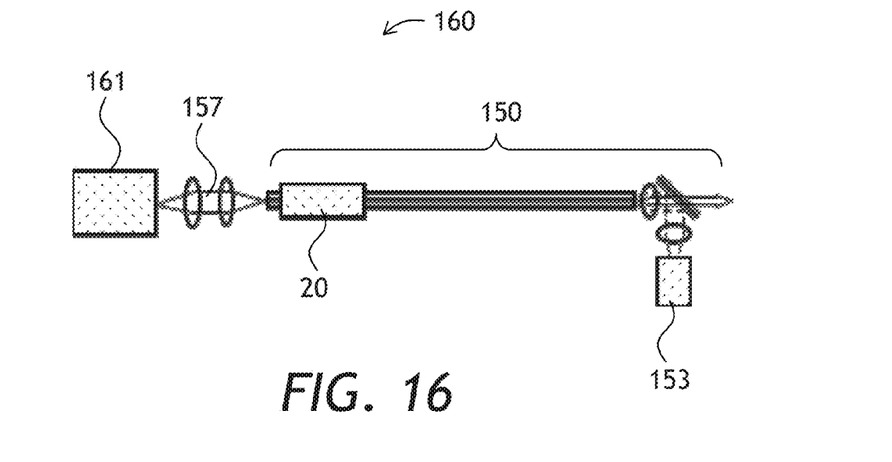
FIG. 16 is a schematic view of a fiber laser including the optical fiber amplifier of FIG. 15.

Turning to FIG. 16 with further reference to FIG. 15, a fiber laser 160 includes the optical fiber amplifier 150 and an oscillator 161 optically coupled to the optical fiber amplifier 150 for generating the input optical signal 157. The function of the cladding light stripper 20 is to remove as much cladding light as possible from the inner cladding 24, to prevent overheating, damage, or de-stabilization of the oscillator 161.

The cladding light stripper 20 can also be used in various other configurations, for example (1) in a fiber amplifier, not shown, in which the propagation direction of the signal 157 is in the same direction as that of the pump, and the cladding light stripper 20 is disposed near the output end of the active fiber or in a passive delivery fiber spliced to the active fiber, thus stripping both pump and signal light in the cladding; (2) in a double-pass fiber amplifier, not shown, in which the optical signal 157 in the core is reflected so that the optical signal 157 passes twice through the active fiber; (3) in a fiber oscillator, not shown, formed by an active fiber and two reflectors, the cladding light stripper 20 being disposed at the opposite end of the oscillator from the pump; or (4) in an autonomous power-delivery fiber, not shown, that can be attached, e.g. by pluggable connectors or by fiber splicing, to a laser system.

Figure 17:
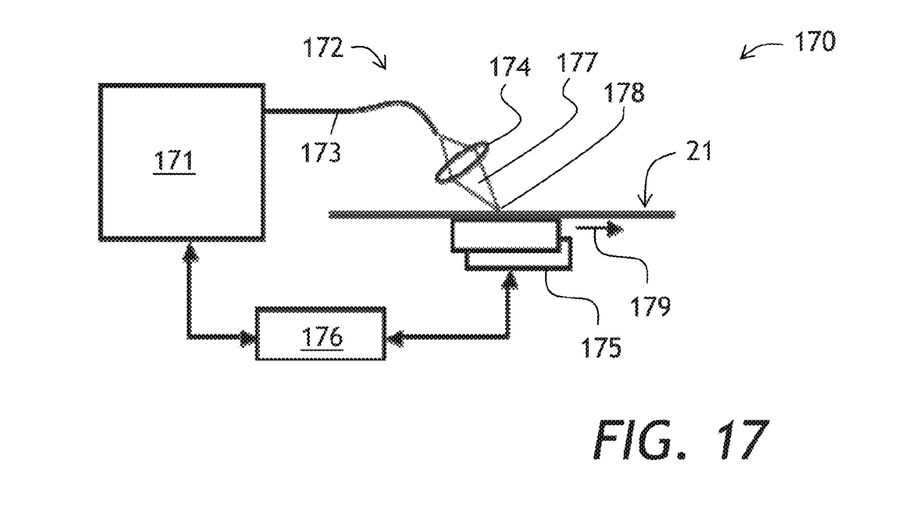
FIG. 17 is a schematic side view of a system for making notches on an optical fiber according to the invention.
Figure 18:
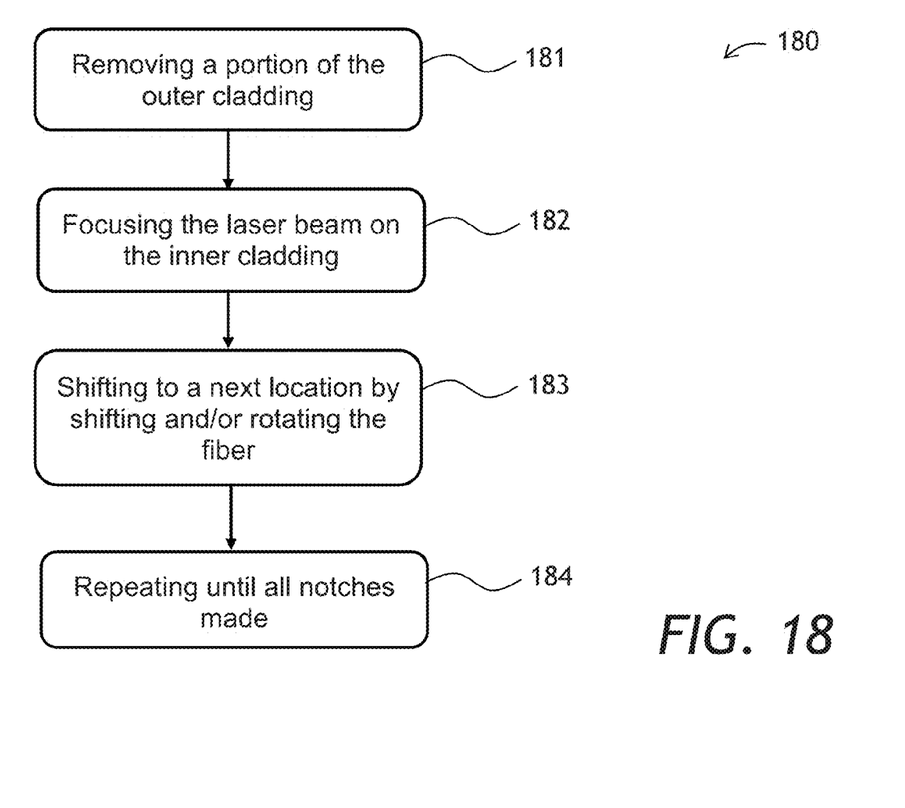
FIG. 18 is a flow chart of a method of manufacturing the cladding mode stripper of FIG. 2A using the system of FIG. 17.

According to the invention, the cladding light stripper 20 is preferably manufactured by laser-material ablation using a manufacturing system 170 shown in FIG. 17. The manufacturing system 170 includes a $CO_2$ laser 171, a beam delivery system 172 including a delivery fiber 173 and a process head 174, a motorized translation/rotation stage 175, and a computer 176 configured for controlling the $CO_2$ laser 171 and the translation/rotation stage 175. Referring to FIG. 18 with further reference to FIG. 2A and FIG. 17, a method 180 of manufacturing the cladding light stripper 20 includes a step 181 of removing the portion 26 of the outer cladding 25 leaving the section 27 of the outer surface 28 of the inner cladding 24 exposed. Then, in a step 182, the stripped fiber 21 is placed onto the motorized translation/rotation stage 175, and the process head 174 focuses an output laser beam 177 of the $CO_2$ laser 171. The output laser beam 177 can be focused in a spherical or elliptical focal spot 178 on the outer surface 28 of the exposed section 27. To that end, the process head 174 can include a combination of spherical/meniscus and/or cylindrical lenses, not shown. The $CO_2$ laser 171 is preferably operated in gated mode in tens to hundreds of microseconds, and the peak intensity of the focused laser beam is selected to be above the damage threshold of the inner cladding material, for example between 100 kW/cm$^2$ and 200 kW/cm$^2$ for fused silica, depending on pulse duration. The focal spot 178 can be between 80 micrometers and 200 micrometers in size. The focal spot 178 can shaped, and/or the laser beam 177 can be angled, to produce a desired shape of the notch 29.

After one notch 29 is made by one or multiple shots of pulses, the laser beam 177 is focused on to the next position in a step 183, by moving either the fiber 21 as indicated by an arrow 179 using the translation/rotation stage 175, or the laser beam 177, to create consequent notches 29. Then, in a step 184, the focusing and ablating step 182 is repeated, the fiber 21 is shifted to a next position, and so on. The spacing between adjacent notches 29 can be identical or varying, controlled either manually or automatically via the computer 176 and the translation/rotation stage 175 to displace the optical fiber 21 lengthwise, to achieve desired stripping efficiency and/or heat load distribution as explained above. The width w and the depth d of the notches 29 is controlled by changing the $CO_2$ laser 171 and/or focusing parameters, i.e. numbers of shots on each notch 29, peak power, laser pulse duration, laser temporal waveform, laser focus intensity, laser focal spot size, position of the fiber 21 relative to laser focus 178, and the like.

The manufacturing system 170 can be used to make the cladding light stripper 20 in any fiber even on an existing laser system, with no additional splice required. This is advantageous, because additional splices could further introduce core light loss and degradation in output laser beam quality.

The notches 29 can be made on one or multiple sides of the fiber 21 as shown in FIGS. 4A to 4D, by either rotating the fiber 21 using the translation/rotation stage 175, or using multiple laser beams, not shown. The number of sides where the notches 29 are made is dictated by the desired stripping efficiency and/or other requirements. Other laser types can be used to form the notches, for example UV lasers.

Referring back to FIGS. 2A and 2B with further reference to FIGS. 17 and 18, the cladding mode stripper 20 manufactured using the $CO_2$ laser system 170 (FIG. 17) and the method 180 (FIG. 18) has been demonstrated to strip up to 500 W of the inner cladding light 33, with very low temperature coefficient for fused silica inner cladding 24, typically about 0.06° C. per one Watt (W) of removed optical power, and for polymer outer cladding 25, typically ~0.03° C./W. A cladding mode stripper 20 only 40 millimeters long can create about 19 dB of attenuation for low NA of less than 0.08 cladding light portions 30A, 30B, at the power level of 500 W. Typically, at least 16-23 dB stripping efficiency was achieved, with an occasional efficiency of up to 32 dB for low NA cladding light portions 30A, 30B of less than 0.08.

Another advantage of the cladding light stripper 20 is that even with extensive modifications on the surface 28 of the inner cladding 24, little or no degradation of the tensile strength of the optical fiber 21 was observed. All prototype devices had been tested with bending test and all passed equivalent tensile strength of 50 kPSI. Furthermore, a packaged prototype cladding light stripper 20 has passed standard industrial 25 G shock test and 5 G sine sweep vibration test.

Since laser notching fabrication method 180 of FIG. 18 could introduce refractive index change on the core 22 of the optical fiber 21, it is possible that such device could introduce insertion loss or degradation in mode quality. One way to mitigate this effect is to lessen the depth d of the notches 29, or select a notch pitch that is different from a resonance frequency which will couple the fundamental mode of the core light 23 into a higher order mode. These factors are preferably taken into consideration when selecting notch pitch. It has been experimentally confirmed that no loss in the core optical power or degradation in the mode quality was observed with prototypes of the cladding light strippers 20.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A cladding light stripper comprising:
a double-clad optical fiber having a core for guiding signal light, an inner cladding surrounding the core, and an outer cladding surrounding the inner cladding,
the double-clad optical fiber including a stripped portion, and
the outer cladding being removed, thereby forming an exposed section of an outer surface of the inner cladding,
the exposed section including a plurality of transversal notches, disposed along the double-clad optical fiber, to enable light to escape the inner cladding upon impinging on the plurality of transversal notches,
each of the plurality of transversal notches having a depth of only a partial distance to the core,
each of the plurality of transversal notches having a pitch from 1 notch/cm to 1000 notches/cm, and
the plurality of transversal notches including at least 10 notches.

2. The cladding light stripper of claim 1, wherein the core includes a dopant for amplifying the signal light when pumped by pump light guided by the inner cladding.

3. The cladding light stripper of claim 1, wherein the plurality of transversal notches have a pitch gradually varying along a length of the exposed section.

4. The cladding light stripper of claim 3, wherein the pitch varies between 2 notches/cm and 200 notches/cm.

5. The cladding light stripper of claim 1, wherein at least one of:
respective depths of the plurality of transversal notches are between 5% and 20% of a diameter of the inner cladding, or
respective depths of the plurality of transversal notches are between 20 micrometers to 80 micrometers deep.

6. The cladding light stripper of claim 1, wherein respective depths of the plurality of transversal notches gradually vary along a length of the exposed section.

7. The cladding light stripper of claim 1, wherein the plurality of transversal notches are spaced along a length and around a circumference of the exposed section.

8. The cladding light stripper of claim 1, wherein the stripped portion is at least 40 mm in length.

9. The cladding light stripper of claim 1, wherein the exposed section comprises a curved section having a bend radius of between 50 cm and 200 cm.

10. The cladding light stripper of claim 1, further comprising;
a heat sink for absorbing light that escapes the inner cladding and for dissipating heat produced by the absorbed light.

11. The cladding light stripper of claim 10, wherein the heat sink forms a cavity around the stripped portion for intercepting the light escaped from the inner cladding,
the cavity having an absorbing portion and a reflecting portion for directing the escaped light to the absorbing portion,
wherein the absorbing portion is thermally connected to an external heat sink.

12. An optical fiber amplifier comprising:
the cladding light stripper of claim 1;
an amplifier double-clad optical fiber portion coupled to the double-clad optical fiber at a first end of the amplifier double-clad optical fiber portion, and
a pump diode optically coupled to a second opposing end of the amplifier double-clad optical fiber portion, for providing pump light for propagation from the second end to the first end of the amplifier double-clad optical fiber portion.

13. The optical fiber amplifier of claim 12, wherein
the pump diode has a pump rating of at least 200 W, and
the cladding light stripper has a light stripping efficiency of at least 15 dB.

14. A fiber laser comprising the optical fiber amplifier of claim 13 and an oscillator optically coupled thereto.

15. A method of forming the cladding light stripper of claim 1, the method comprising;
focusing a laser beam on the outer surface of the inner cladding in the exposed section to remove the inner cladding locally to form a transversal notch in the inner cladding; and
repeating the focusing of the laser beam a plurality of times at different locations along the exposed section.

16. The method of claim 15, wherein the double-clad optical fiber is moved, while repeating the focusing of the laser beam, to create consequent notches.

17. The method of claim 16, wherein
a $CO_2$ laser is used to generate the laser beam,
the $CO_2$ laser is operated in a gated mode at a pulse duration of tens to hundreds of microseconds, and
the laser beam is focused to optical power densities between 100 kW/cm$^2$ and 200 kW/cm$^2$.

18. The method according to claim 17, wherein
the laser beam is focused to a focal spot size of 80 micrometers to 200 micrometers, and
the focal spot is shaped, or the laser beam is angled, to produce a desired shape of the notch.

19. The method according to claim 15, wherein repeating the focusing of the laser beam includes automatically controlling a spacing between adjacent notches using a computer-controlled translation stage for displacing the double-clad optical fiber lengthwise.

20. The cladding light stripper of claim 10, wherein the heat sink is disposed adjacent the stripped portion of the double-clad optical fiber.

* * * * *